United States Patent
Österling et al.

(10) Patent No.: US 10,524,273 B2
(45) Date of Patent: Dec. 31, 2019

(54) RESOURCE CONFIGURATION OF WIRELESS DEVICES

(71) Applicant: TELEFONAKTIEBOLAGET LM ERICSSON (PUBL), Stockholm (SE)

(72) Inventors: Jacob Österling, Järfälla (SE); Jonas Karlsson, Upplands Väsby (SE); Oskar Mauritz, Johanneshov (SE); Christer Östberg, Staffanstorp (SE); Jan Roxbergh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 69 days.

(21) Appl. No.: 15/320,453

(22) PCT Filed: Oct. 25, 2016

(86) PCT No.: PCT/SE2016/051035
§ 371 (c)(1),
(2) Date: Dec. 20, 2016

(87) PCT Pub. No.: WO2018/048331
PCT Pub. Date: Mar. 15, 2018

(65) Prior Publication Data
US 2018/0213598 A1 Jul. 26, 2018

Related U.S. Application Data

(60) Provisional application No. 62/383,866, filed on Sep. 6, 2016.

(51) Int. Cl.
*H04W 72/12* (2009.01)
*H04W 88/08* (2009.01)
(Continued)

(52) U.S. Cl.
CPC .......... *H04W 72/12* (2013.01); *H04B 7/0617* (2013.01); *H04B 7/0639* (2013.01);
(Continued)

(58) Field of Classification Search
CPC . H04W 88/085; H04W 72/046; H04W 16/28; H04W 24/02; H04W 88/08;
(Continued)

(56) References Cited

U.S. PATENT DOCUMENTS 8,644,368 B1    2/2014  Zhang et al.
8,923,386 B2   12/2014  Samardzija et al.
(Continued)

FOREIGN PATENT DOCUMENTS

EP    0843494 A2    5/1998
EP    1827035 A1    8/2007
(Continued)

OTHER PUBLICATIONS

ZTE et al., High level views on beam management for NR-MIMO, 3GPP TSG RAN WG1 Meeting #88, R1-1701797, Athens, Greece, Feb. 13-17, 2017.
(Continued)

*Primary Examiner* — Dady Chery

(57) ABSTRACT

A method is performed by a radio equipment (RE) of an access node. The RE has an interface to a radio equipment controller (REC) of the access node. The method comprises configuring the resources for at least one of uplink reception and downlink transmission selectively using beamforming weights determined either based on internal information obtained locally in the RE, or based on external information received from the REC over the interface.

26 Claims, 8 Drawing Sheets

(51) Int. Cl.
*H04B 7/06* (2006.01)
*H04W 16/28* (2009.01)
*H04W 72/04* (2009.01)
*H04L 5/00* (2006.01)
*H04W 28/00* (2009.01)
*H04W 28/12* (2009.01)
*H04L 27/26* (2006.01)

(52) U.S. Cl.
CPC ............ *H04L 5/003* (2013.01); *H04L 5/0044* (2013.01); *H04L 5/0048* (2013.01); *H04L 5/0053* (2013.01); *H04L 5/0057* (2013.01); *H04L 27/2601* (2013.01); *H04W 16/28* (2013.01); *H04W 28/00* (2013.01); *H04W 28/12* (2013.01); *H04W 72/042* (2013.01); *H04W 72/046* (2013.01); *H04W 72/1268* (2013.01); *H04W 72/1289* (2013.01); *H04W 88/085* (2013.01); *H04L 27/26* (2013.01)

(58) Field of Classification Search
CPC ... H04W 84/045; H04W 72/00; H04W 72/04; H04B 7/0639; H04B 7/0617
See application file for complete search history.

(56) References Cited

U.S. PATENT DOCUMENTS

| | | | |
|---|---|---|---|
| 2007/0072646 A1 | 3/2007 | Kuwahara et al. | |
| 2010/0074121 A1 | 3/2010 | Sakama | |
| 2010/0075678 A1 | 3/2010 | Akman et al. | |
| 2010/0136932 A1* | 6/2010 | Osterling | H01Q 21/28 455/115.1 |
| 2010/0273498 A1* | 10/2010 | Kim | H04W 24/02 455/450 |
| 2011/0032910 A1 | 2/2011 | Aarflot et al. | |
| 2012/0057548 A1 | 3/2012 | Hasegawa | |
| 2012/0300710 A1 | 11/2012 | Li et al. | |
| 2013/0157660 A1 | 6/2013 | Awad et al. | |
| 2013/0294419 A1 | 11/2013 | Heiser et al. | |
| 2014/0119312 A1 | 5/2014 | Doetsch et al. | |
| 2015/0029965 A1 | 1/2015 | Aminaka et al. | |
| 2015/0030094 A1 | 1/2015 | Zhang | |
| 2015/0303950 A1 | 10/2015 | Shattil | |
| 2018/0317238 A1 | 11/2018 | Roxbergh et al. | |

FOREIGN PATENT DOCUMENTS

| | | |
|---|---|---|
| EP | 2515590 A1 | 10/2012 |
| EP | 2515603 A2 | 10/2012 |
| EP | 2685755 A1 | 1/2014 |
| EP | 2739105 A1 | 6/2014 |
| EP | 2785099 A1 | 10/2014 |
| EP | 2911331 A1 | 8/2015 |
| TW | 201304448 A1 | 1/2013 |
| WO | 2014076004 A1 | 5/2014 |
| WO | 2015/197102 A1 | 12/2015 |
| WO | 2015/197104 A1 | 12/2015 |
| WO | 2016/039839 A1 | 3/2016 |
| WO | 2016195555 A1 | 12/2016 |
| WO | 2016195556 A1 | 12/2016 |
| WO | 2018093301 A1 | 5/2018 |

OTHER PUBLICATIONS

De La Oliva, et al., An Overview of the CPRI Specification and Its Application to C-RAN-Based LTE Scenarios, IEEE Communications Magazine, vol. 54, No. 2, pp. 152-159, Feb. 2016.

Common Public Radio Interface (CPRI); Interface Specification; CPRO Specification V7.0, Oct. 9, 2015.

CPRI Specification V6.1 Common Public Radio Interface (CPRI); Interface Specification, Jul. 1, 2014.

Lorca et al., "Lossless Compression Technique for the Fronthaul of LTS/LTE-Advanced Cloud-RAN Architectures", 2013 IEEE 14th International Symposium on a World of Wireless, Mobile and Multimedia Networks(WOWMOM), IEEE, pp. 1-9, Jun. 4, 2013.

Park et al., "Large-scale Antenna Operation in Heterogeneous Cloud Radio Access Networks: A Partial Centralization Approach", IEEE Wireless Communications; vol. 22, No. 3, Jun. 1, 2015, pp. 1-9.

Sayeed et al., "Beamspace MIMO for High-Dimensional Multiuser Communication at Millimeter-Wave Frequencies", 2013 IEEE Global Communications Conference (Globecom), Dec. 9, 2013, pp. 3679-3684.

China Mobile Research Institute, "C-RAN: The road towards green RAN," China Mobile White Paper, v2, 2011.

Samardzija et al., "Compressed transport of baseband signals in radio access networks," IEEE Transactions on Wireless Communications, vol. 11, No. 9, pp. 3216-3225, 2012.

Park et al., "Robust and efficient distributed compression for cloud radio access networks," Vehicular Technology, IEEE Transactions on, vol. 62, No. 2, pp. 692-703, 2013.

Nieman et al., "Time-Domain Compression of Complex-Baseband LTE Signals for Cloud Radio Access Networks," GlobalSIP 2013.

Maiden, "Low-loss compression of CPRI baseband data," EDN Network paper, Sep. 17, 2014.

* cited by examiner

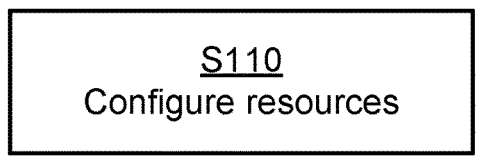
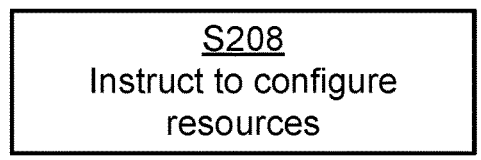
Fig. 7
Fig. 9
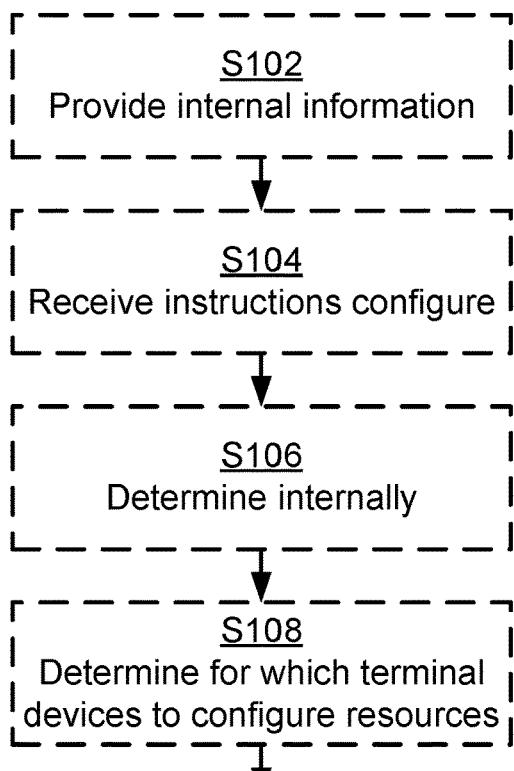
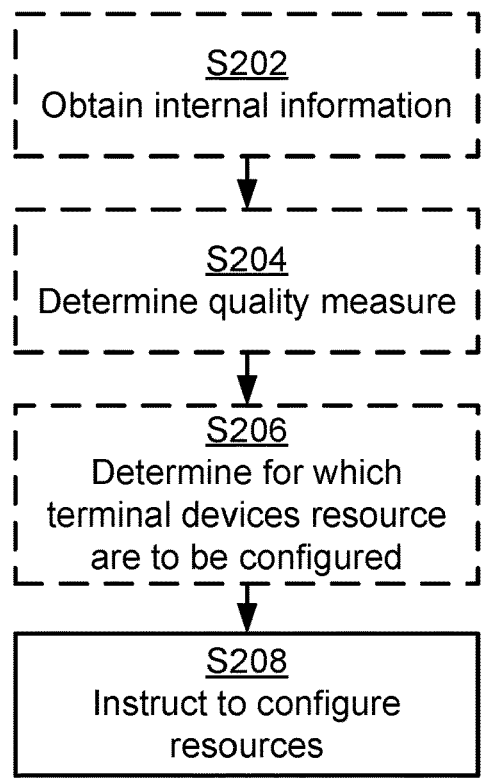
Fig. 10
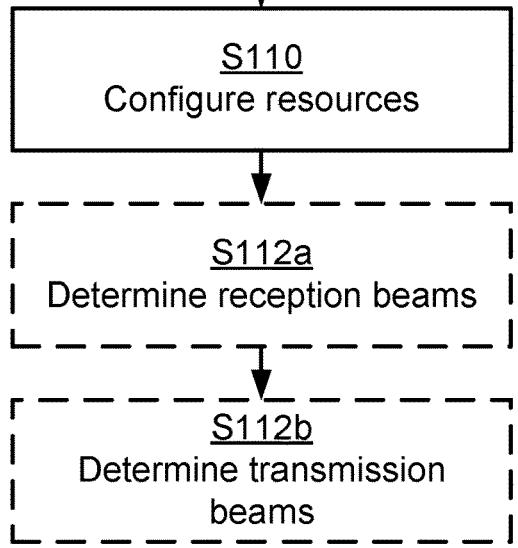
Fig. 8

US 10,524,273 B2

RESOURCE CONFIGURATION OF WIRELESS DEVICES

This application is a 371 of International Application No. PCT/SE2016/051035, filed Oct. 25, 2016, which claims the benefit of U.S. Application No. 62/383,866, filed Sep. 6, 2016, the disclosures of which are fully incorporated herein by reference.

TECHNICAL FIELD

Embodiments presented herein relate to a method, an RE, a computer program, and a computer program product for configuring resources for terminal devices. Embodiments presented herein further relate to a method, an REC, a computer program, and a computer program product for configuring resources for terminal devices.

BACKGROUND

In communications systems, there may be a challenge to obtain good performance and capacity for a given communications protocol, its parameters and the physical environment in which the communications system is deployed.

For example, the introduction of digital beamforming antenna systems in access nodes, such as radio base stations, etc., could allow multiple simultaneous narrow beams to be used to provide network access to, and thus serve, multiple simultaneous served terminal devices, such as user equipment (UE), etc. However, the current split in the access nodes between a radio equipment controller (REC) and a radio equipment (RE) as interconnected by the Common Public Radio Interface (CPRI) may no longer be feasible as passing the data for each individual radio chain over the CPRI interface could drive prohibitively high data rates.

In more detail, the bit rate of the current CPRI interface scales directly to the number of independent radio chains in the RE. When having e.g., a 200 MHz carrier bandwidth and 128 physical antenna elements in the beamforming antenna system, a bit rate of 530 Gbps would be needed for the CPRI interface with currently used sample coding. A further potential drawback with CPRI is the extra latency from uplink (UL; from terminal device to access node) sampling to the time the data can be used in downlink (DL; from access node to terminal device), as any information needs to loop in the REC.

One way to address the above-mentioned issues is to collapse the CPRI based architecture by removing the CPRI interface and putting the functionality of the REC in the RE. This approach has at least two drawbacks. Firstly, due to faster technological development of the REC compared to the RE, the technical lifetime of the REC is assumed to be shorter than that of the RE. Replacing the RE is more costly than replacing the REC. From this aspect it could thus be beneficial to keep the functionality of the RE as simple as possible. Secondly, the REC could be configured to make decisions spanning over multiple REs in order to make coordinated multi-sector decisions, e.g. when some REs represent coverage regions of the access node within the coverage regions of other REs (e.g. a so-called micro cell within a so-called macro cell). A collapsed architecture loses this overarching coordination possibility.

Hence, there is a need for an improved communication between the REC and the RE.

SUMMARY

An object of embodiments herein is to provide efficient communication between the REC and the RE.

According to a first aspect there is presented a method for configuring resources for terminal devices. The method is performed by an RE of an access node. The RE has an interface to an REC of the access node. The method comprises configuring the resources for at least one of uplink reception and downlink transmission selectively using beamforming weights determined either based on internal information obtained locally in the RE, or based on external information received from the REC over the interface.

According to a second aspect there is presented an RE of an access node for configuring resources for terminal devices. The RE has an interface to an REC of the access node. The RE comprises processing circuitry. The processing circuitry is configured to cause the RE to configure the resources for at least one of uplink reception and downlink transmission selectively using beamforming weights determined either based on internal information obtained locally in the RE, or based on external information received from the REC over the interface.

According to a third aspect there is presented RE of an access node for configuring resources for terminal devices. The RE has an interface to an REC of the access node. The RE comprises processing circuitry and a storage medium. The storage medium stores instructions that, when executed by the processing circuitry, cause the RE to configure the resources for at least one of uplink reception and downlink transmission selectively using beamforming weights determined either based on internal information obtained locally in the RE, or based on external information received from the REC over the interface.

According to a fourth aspect there is presented an RE of an access node for configuring resources for terminal devices. The RE has an interface to an REC of the access node. The RE comprises a configure module configured to configure the resources for at least one of uplink reception and downlink transmission selectively using beamforming weights determined either based on internal information obtained locally in the RE, or based on external information received from the REC over the interface.

According to a fifth aspect there is presented a computer program for configuring resources for terminal devices, the computer program comprising computer program code which, when run on processing circuitry of an RE, causes the RE to perform a method according to the first aspect.

According to a sixth aspect there is presented a method for configuring resources for terminal devices. The method is performed by an REC of an access node. The REC has an interface to an RE of the access node. The method comprises instructing the RE to selectively configure the resources for at least one of uplink reception and downlink transmission using beamforming weights determined either based on internal information obtained locally in the RE, or based on external information received from the REC over the interface.

According to a seventh aspect there is presented an REC of an access node for configuring resources for terminal devices. The REC has an interface to an RE of the access node. The REC comprises processing circuitry. The processing circuitry is configured to cause the REC to instruct the RE to selectively configure the resources for at least one of uplink reception and downlink transmission using beamforming weights determined either based on internal information obtained locally in the RE, or based on external information received from the REC over the interface.

According to an eighth aspect there is presented an REC of an access node for configuring resources for terminal devices. The REC has an interface to an RE of the access node. The REC comprises processing circuitry and a storage medium. The storage medium stores instructions that, when executed by the processing circuitry, cause the REC to instruct the RE to selectively configure the resources for at least one of uplink reception and downlink transmission using beamforming weights determined either based on internal information obtained locally in the RE, or based on external information received from the REC over the interface.

According to a ninth aspect there is presented an REC of an access node for configuring resources for terminal devices. The REC has an interface to an RE of the access node. The REC comprises an instruct module configured to instruct the RE to selectively configure the resources for at least one of uplink reception and downlink transmission using beamforming weights determined either based on internal information obtained locally in the RE, or based on external information received from the REC over the interface.

According to a tenth aspect there is presented a computer program for configuring resources for terminal devices, the computer program comprising computer program code which, when run on processing circuitry of an REC, causes the REC to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these REs, these RECs, and these computer programs allows for efficient communications between the RE and the REC when configuring resources for terminal devices.

Advantageously these methods, these REs, these RECs, and these computer programs allows for large-scale digital beamforming in the access node without significantly upgrading the data rate of the interface between the RE and the REC.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 7, 8, 9, and 10 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
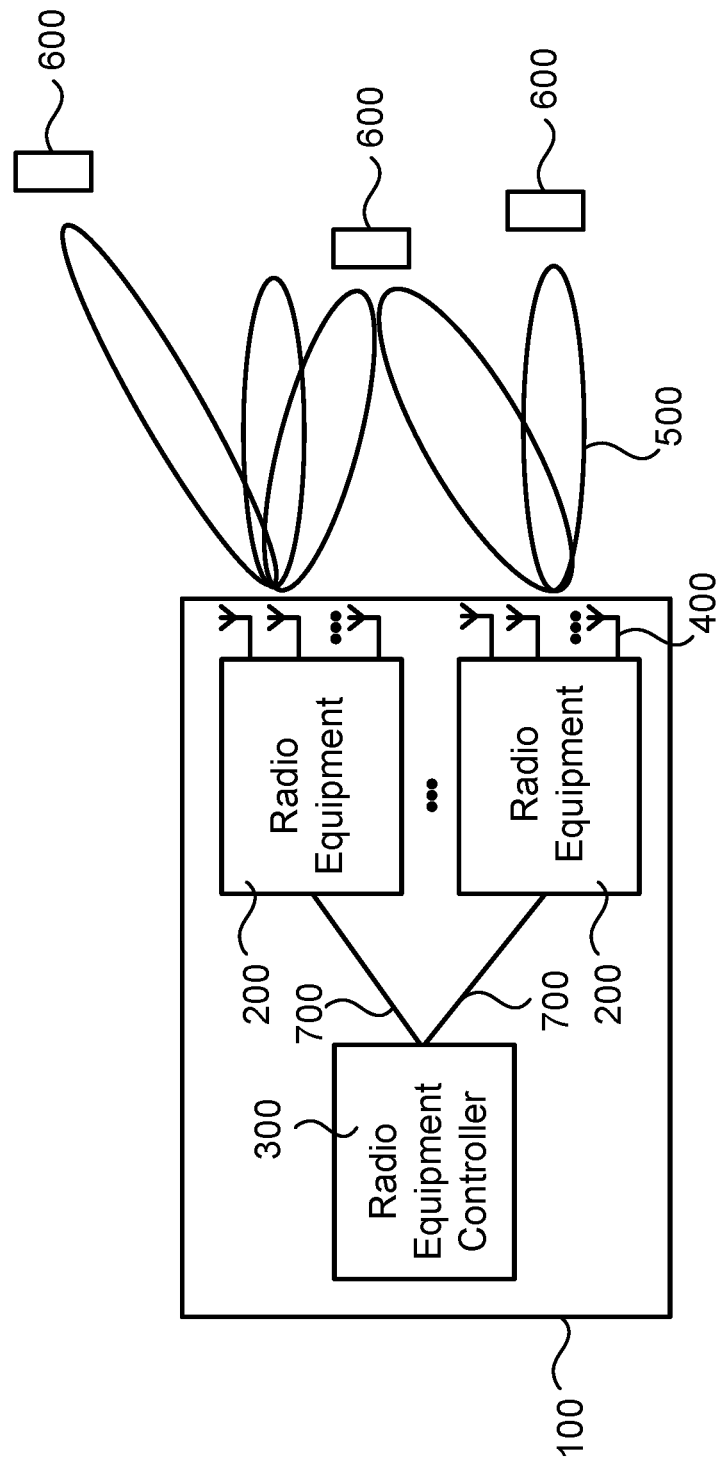
FIGS. 1, 2, 3, 4, 5, and 6 are schematic diagrams illustrating an access node according to embodiments.

FIG. 1 is a schematic diagram illustrating an access node 100 where embodiments presented herein can be applied. The access node could be a radio base station such as a radio access network node, base transceiver station, node B, evolved node B, or access point. As disclosed above, the access node comprises at least one Radio Equipment Controller (REC) 300 and at least one Radio Equipment (RE) 200. In the illustrative example of FIG. 1 the access node comprises one REC and two REs, where the REC has one interface 700 to each of the REs. Properties of the interface 700 between the REC and the RE will be disclosed below. The REs are configured to perform DL transmissions to, and UL receptions from, terminal devices boo in beams 500 by using appropriate beamforming weights at the antennas 400. The beamforming weights define at least the pointing direction and the width of the beams. How to determine the beamforming weights will be disclosed below.

As defined herein the REC does not send in-phase/quadrature (I/Q) samples per physical radio branch to the RE, but rather multiple-input multiple-output (MIMO) streams, i.e., I/Q samples per layer. According to the current CPRI specification, the REC can directly address the antennas in the RE, but in the herein disclosed access node that is configured to perform beamforming, the RE performs the functionality of mapping a MIMO stream to a set of physical antenna elements in order to generate a wanted beam form. Further, in order to enable efficient simultaneous multi user beamforming, the Fast Fourier Transform (FFT) and Inverse Fast Fourier Transform (IFFT) functions are performed in the RE. In addition, the execution of the beamforming data plane functionality is added to the RE. Further, the interface between REC and RE could be a packet-based interface, and hence no longer a streaming interface, sending the (frequency domain) samples to the RE symbol by symbol. This allows for quick and flexible allocation of resources on the interface to different terminal devices. The REC is configured to maintain knowledge about the terminal devices, and schedules the air interface between the access node and the terminal devices. The RE is configured to act on commands received from the REC.

As an illustrative example, consider a communications system having an air interface with a system bandwidth of 400 MHz and that provides support for 4 MIMO streams and utilizes access nodes with 64 antennas for beamforming. Using CPRI interfaces between the REC and the RE exposing all 64 antennas for the REC would require approximately 54 CPRI interfaces of 10 Gbps, since a CPRI interface carries about 480 MHz. Further, an interface using virtual antenna ports would require 4 MIMO streams of 400 MHz, and would require about 4 CPRI interfaces of 10 Gbps, since one 10 Gbps CPRI interface still carries data for about 480 MHz. By also moving the modulation DL to the RE, the 4 MIMO streams of 400 MHz would require 7 Gbps (assuming 256QAM and 20 LTE 20 MHz carriers), or one 10 Gbps CPRI interface. A higher bitrate of the CPRI interface is required in the UL if the whole system bandwidth is used, as demodulation is still performed in the REC.

Figure 2:
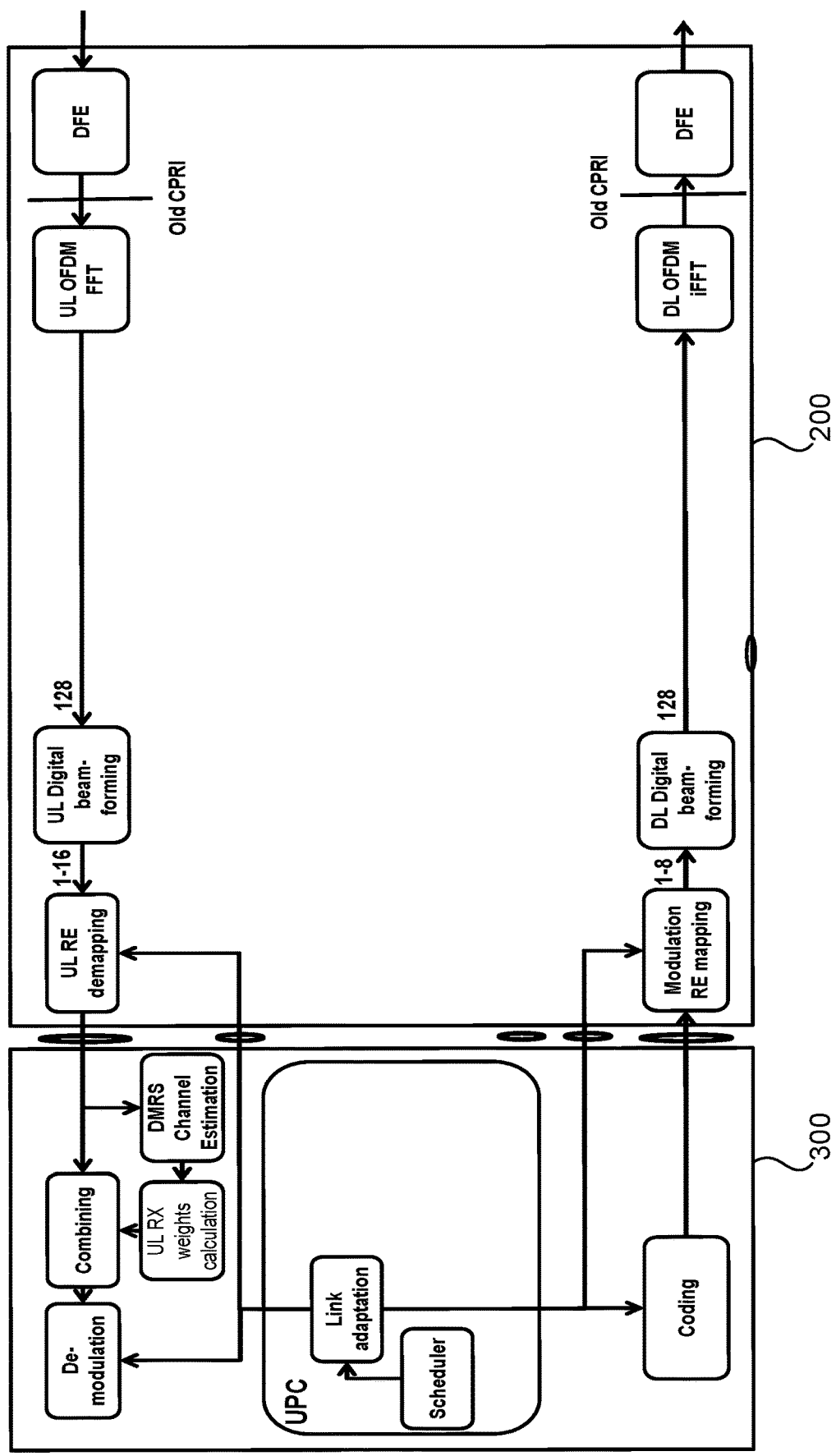

Consider the REC and RE illustrated in FIG. 2 where the REC and RE are interconnected via an interface denoted RUI, for Radio Unit Interface. In the DL direction the REC sends unmodulated bits for each terminal device. The RE modulates the data, places it on the correct subcarrier (thus performing resource mapping), applies beamforming weights (individual per radio branch) defining e.g. width and/or direction of the beams and finally convert it to time domain and transmits it to the terminal devices. FIG. 2 shows 1-8 DL MIMO layers on 128 radio branches. In the UL direction the RE samples the signals for each individual radio branch, converts it to frequency domain, applies beamforming weights, combines the signals from the different radio branches and sends a selection of the modulated combined signal to the REC for further demodulation. FIG. 2 shows 128 radio branches and 1-16 receive beams. The receive beams weakly relates to UL MIMO branches as the more MIMO branches the more receive beams are needed. Typically, more receive beams than MIMO branches are required. FIG. 2 also shows beamforming as performed before de-mapping in the RE. The two stages are interlinked as the beamforming is performed individually per terminal device. FIG. 2 further illustrates User Plane Control (UPC) with its air interface scheduling and link adaptation placed in the REC.

Figure 3:
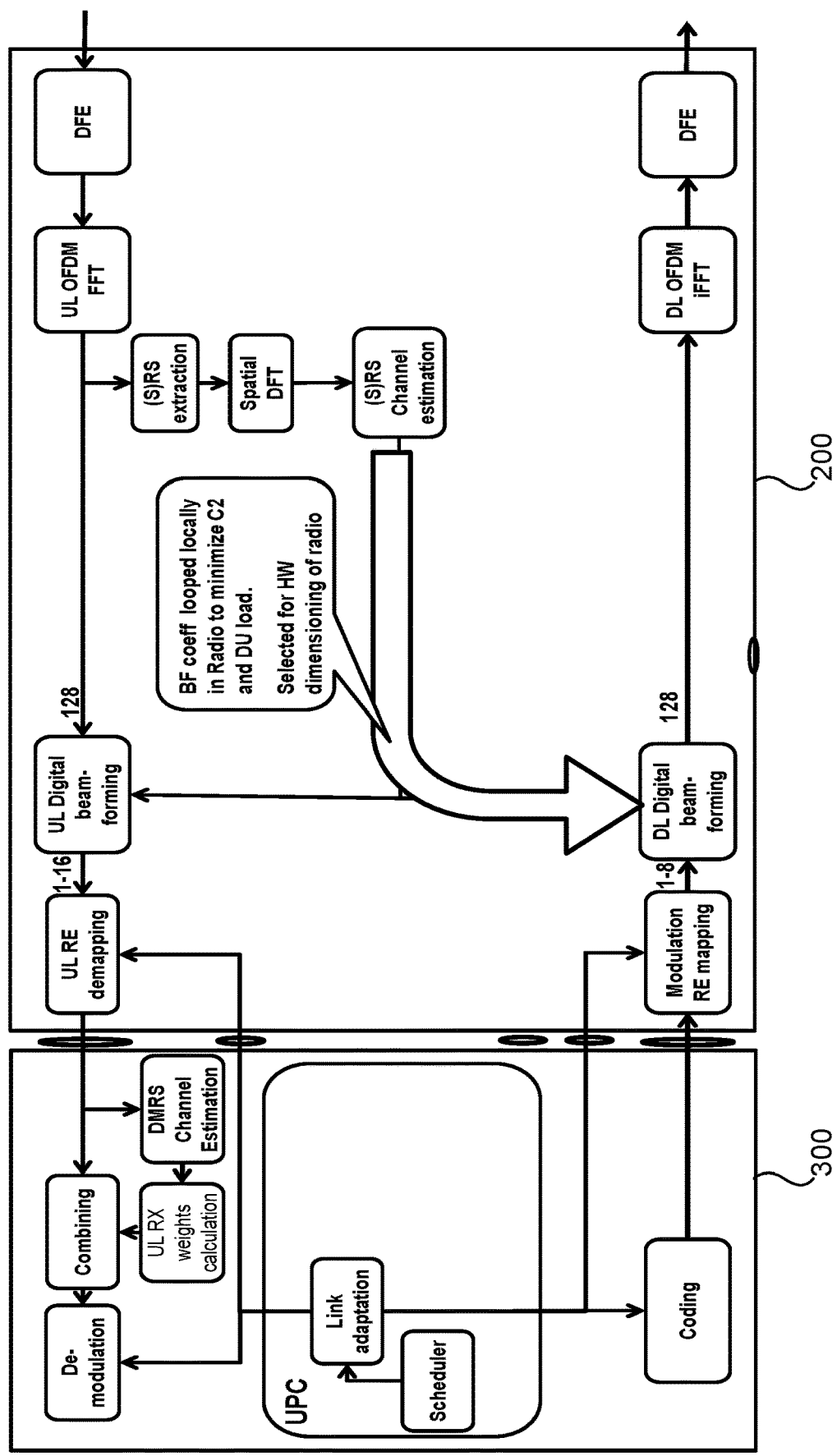

FIG. 3 shows an embodiment of an REC and an RE similar to those in FIG. 2. In FIG. 3 the RE is configured to decode reference symbols such as Sounding Reference symbols (SRS) in the UL, to store information of how the reference symbols are best received (e.g., what beamforming weights maximizes the SNR of the reference symbols) and to use this stored information when performing beamforming in the DL and UL. In FIG. 3 the RE could thus be regarded as autonomous in this respect. To accomplish this, the RE needs to maintain a storage of information identifying the best beam shapes for each terminal device, and be configured to apply that information when the corresponding terminal device is scheduled. This minimizes the communication needed over the interface between the REC and the RE with respect to beamforming, but also hides the channel for the UPC.

The operations as performed by the REC and RE in FIG. 3 could be preferred when the available bitrate of the interface between the REC and the RE is comparatively low. In more detail, assume that the beam dimension not is used for multi-user MIMO (MU-MIMO). Instead the beamforming antenna gain is primarily wanted for extended service coverage. This could imply that neither the UPC nor the Link Adaption (LA) needs information about the resolution of the fixed beam direction space.

The operations as performed by the REC and RE in FIG. 3 could be preferred when an absolutely minimum latency is wanted between reception of reference symbols and its application. An additional scenario is when beam weights are only calculated for the UL. This could be applicable for radio channels where the resources already are scheduled for the UL, i.e., so-called contention based channels, with the aim to keep down the overall latency. The weight calculations could then be based on reference symbols that arrive simultaneously with user data.

Figure 4:
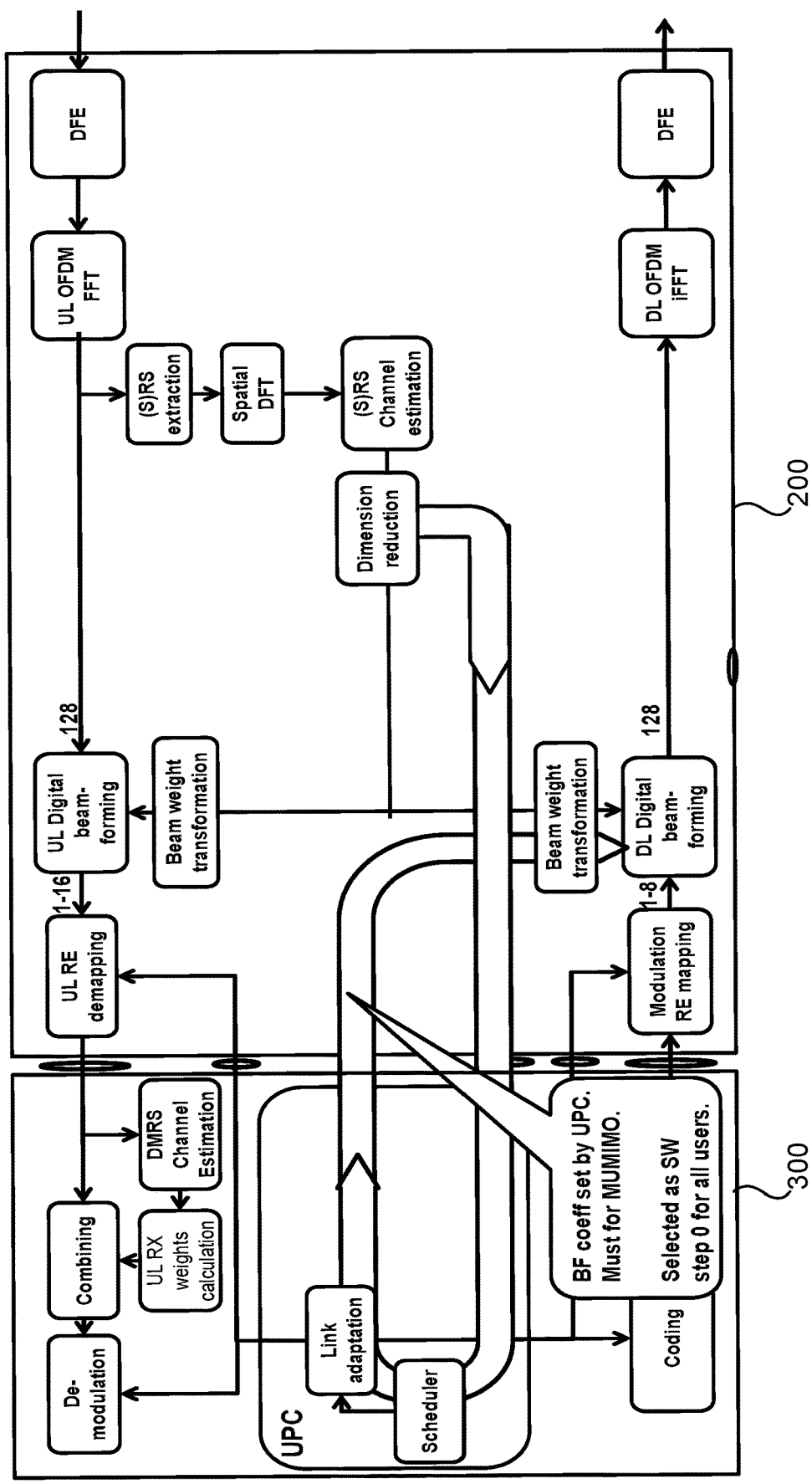

FIG. 4 shows an embodiment of an REC and an RE similar to those in FIG. 2. In FIG. 4 the beamforming control is performed primarily by the UPC in the REC. The RE still receives the reference symbols and determines information of how the reference symbols are best received. This information is then sent to the REC. The REC uses this information to make an optimal decision on MIMO streams, link adaptation and coordinated scheduling with other terminal devices, such as MU-MIMO or nulling.

To make the communication and functionality performed in the UPC generic and not heavy dependent on the actual implementation of the RE (e.g., in terms of number of branches, antenna layout, etc.) or operating mode (e.g., power save, faulty branches, etc.), the communications between the REC and the RE regarding beamforming properties is expressed in beam direction space rather than antenna element space. That is, instead of presenting a beam as a set of weights of physical antenna elements the beam is presented as a combination of a set of predetermined beams. This also allows for a more compressed format for this communication, thus saving bit rate on the interface between the REC and the RE. For instance, a linear combination of 3 predetermined beams could be expressed as 3 times 24 bits (an 8-bit beam number+an 8-bit amplitude+an 8-bit phase) rather than 128 times 16 bits (an 8-bit amplitude+an 8-bit phase for each of the 128 physical antenna elements). The transformation from the physical antenna element space to the beam space is performed by a Dimensions Reduction entity, and the inverse transformation is performed by a Beam Weight Transformation entity.

The operations as performed by the REC and RE in FIG. 4 could be preferred when the load of the access node is comparatively high and UPC needs to determine the channel state for the best decision on link adaptation.

The operations as performed by the REC and RE in FIG. 4 could be preferred when MU-MIMO or nulling is used, as the UPC then needs channel state information for the LA of the combination, and to determine which users are suitable for simultaneous scheduling, so called MU-MIMO scheduling. Note that nulling may also be applied between terminal devices served by different REs, and is therefore impossible to perform within one autonomous RE (as in FIG. 3).

Figure 5:
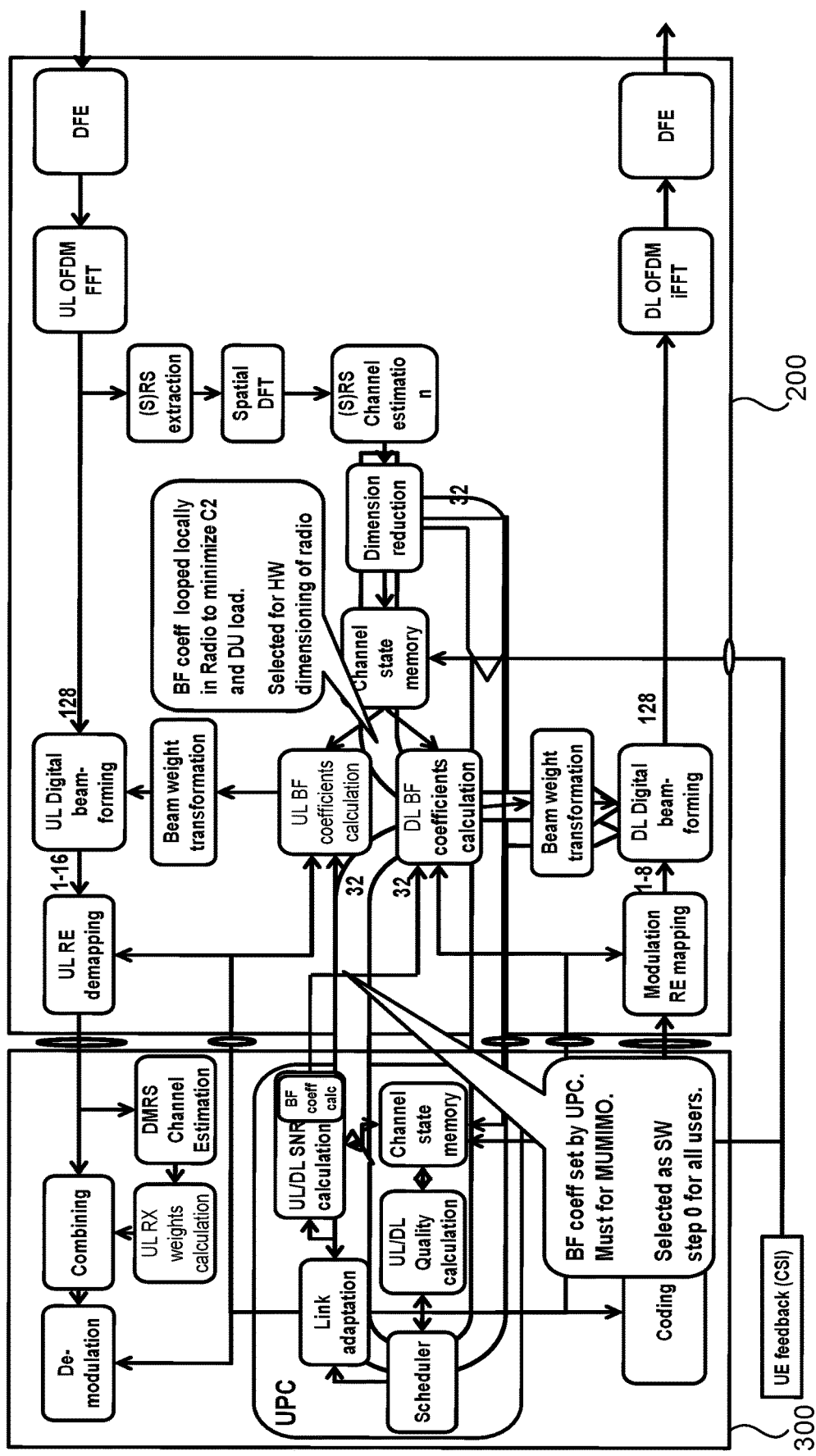

FIG. 5 illustrates an embodiment of an REC and an RE combining the functionality of the REC and RE in the embodiments of FIG. 3 and FIG. 4. In comparison to FIG. 3 and FIG. 4, the embodiment of FIG. 5 comprises a channel state memory, an UL/DL BF coefficient calculation entity (where BF is short for beamforming), an UL/DL quality calculation entity, an UL/DL SNR calculation entity (where SNR is short for signal to noise ratio), and a CSI feedback function (where CSI is short for Channel State Information).

The channel state memory is configured to store reference symbols since the reference symbols are not sent continuously. The transmission rate of the reference symbols is controlled by the access node, and different terminal devices could have different transmission rates of the reference symbols to allow for the access node to follow channel state changes. Although the channel state memory is illustrated as storing data expressed in the beam space in both the RE and the REC, the RE could instead have the channel state memory storing data expressed in the physical antenna element space.

The UL/DL BF coefficient calculation entity is configured to determine beamforming weights based on the channel state memory and possible other constraints (such as nulling and MU-MIMO) in the RE.

The UL RX weights calculation entity (where RX is short for reception) is configured to determine beamforming weights for the uplink. The UL beamforming weight determination can be part of maximum-ratio combining (MRC) in the UL demodulator/equalizer. The UPC will order more beams than layers, and then the demodulation will combine these to improve SNR or suppress interferers. In the REC, the determination of beamforming weights could be performed in conjunction with the link adaptation whereas in the case of beamforming weights determined by the RE, the link adaptation is done independently.

The UL/DL quality calculation entity is configured to determine a quality estimate in respect of each terminal device subject to MU-MIMO scheduling. This quality estimate should reflect the spatial separation between wireless terminals as well as the quality achieved when co-scheduling wireless terminals on the same time/frequency resource. The quality estimate is based on the information in the channel state memory.

The UL/DL SNR calculation entity is configured to determine the beamforming weights for each terminal device, and to provide the link adaptation function with estimates of the resulting SNR for each of the terminal devices being scheduled, including the mutual effect of co-scheduled terminal devices, so called MU-MIMO scheduling. The UE feedback (CSI) entity is configured to extract information about the channel provided by the terminal devices (in the UL data plane). Especially, in the case of FDD, where the reciprocity of the DL and UL of the channel to the terminal device is not perfect, it can be beneficial for the terminal device to send measurements (e.g., CSI) on the DL signal back to the access node. The CSI reports are extracted by the REC and used in the channel state memory and thus being considered in the determination of the beamforming weights.

In configurations where the bitrate of the interface between the REC and the RE is low (such as below a threshold), the determination of beamforming weights is executed by the RE (as in FIG. 3), otherwise the determination is executed by the REC (as in FIG. 4). That is, in case of limited available capacity of the interface between the REC and the RE, the REC (such as in the UPC) determines that the determination of beamforming weights is to be executed by the RE. Cell performance of the access node could be maximized by determining the beamforming weights in the REC for all co-scheduled terminal devices (within the same time and frequency domain) in order to accomplish best link adaptation and orthogonality. This requires that the RE sends extra information to the REC to allow for such determination, and that the REC sends the determined beamforming weights to the RE.

Still further, although the REC sends the determined beamforming weights to the RE, the RE can determine beamforming weights in parallel and thus combine these internally determined beamforming weights with the beamforming weights received from the REC. For access nodes where the interface between the REC and the RE is constrained but not minimized, the dual loops (as defined by the embodiment in FIG. 5) allow for the access node to select some terminal devices which can be handled locally in the RE, thereby making bitrate of the interface between the REC and the RE available to handle terminal devices which are eligible to MU-MIMO scheduling, e.g. terminal devices using a streaming service.

The embodiments disclosed herein thus relate to mechanisms for configuring resources for terminal devices and configuring resources for terminal devices. In order to obtain such mechanisms there is provided an RE, a method performed by the RE, a computer program product comprising code, for example in the form of a computer program, that when run on processing circuitry of the RE, causes the RE to perform the method. In order to obtain such mechanisms there is further provided an REC, a method performed by the REC, and a computer program product comprising code, for example in the form of a computer program, that when run on processing circuitry of the REC, causes the REC to perform the method.

FIGS. 7 and 8 are flow charts illustrating embodiments of methods for configuring resources for terminal devices as performed by the RE. FIGS. 9 and 10 are flow charts illustrating embodiments of methods for configuring resources for terminal devices as performed by the REC. The methods are advantageously provided as computer programs 1520a, 1520b.

Reference is now made to FIG. 7 illustrating a method for configuring resources for terminal devices as performed by the RE of the access node according to an embodiment. As disclosed above the RE has an interface to the REC of the access node. S110: The RE configures the resources for at least one of uplink reception and downlink transmission selectively using beamforming weights determined either based on internal information obtained locally in the RE, or based on external information received from the REC over the interface.

Embodiments relating to further details of configuring resources for terminal devices as performed by the RE will now be disclosed.

There could be different kinds of interfaces between the RE and the REC. As disclosed above, the interface between the REC and the RE could be a packet-based interface. Further, the interface between the REC and the RE could be a RUI. Further, the interface between the REC and the RE could be regarded as an evolved CPRI interface. The interface between the REC and the RE could be wired. However, this does not necessarily mean that the interface between REC and RE is a direct interface. Rather, it is foreseen that at least one intermediate entity could be physically located between the REC and the RE along the interface.

Reference is now made to FIG. 8 illustrating methods for configuring resources for terminal devices as performed by the RE according to further embodiments. It is assumed that step S110 is performed as described above with reference to FIG. 7 and a thus repeated description thereof is therefore omitted.

There may be different examples of internal information. According to an embodiment the internal information is based on channel estimates determined by the RE and information stored in a channel state memory in the RE.

The internal information could be provided to the REC. Hence, according to an embodiment the RE is configured to perform step S102:

S102: The RE provides the internal information to the REC over the interface. The external information is then based on the internal information.

According to an embodiment the internal information is provided to the REC using incrementally higher resolution and/or incrementally lower priority.

According to an embodiment the external information is based on CSI reports.

There may be different examples of internal information. According to an embodiment the external information comprises initial beamforming weights.

There may be different ways for the RE to act depending on whether the resources are configured for uplink reception or downlink transmission. According to an embodiment the RE is configured to perform step S112a when resources for uplink reception are configured:

S112a: The RE determines reception beams using the beamforming weights.

According to an embodiment the RE is configured to perform step S112b when resources for downlink transmission are configured:

S112b: The RE determines transmission beams using the beamforming weights.

There may be different ways for the RE to selectively determine whether to use beamforming weights determined based on the internal information or based on the external information. According to a first example the determination is based on instructions received from the REC. Hence, according to an embodiment the RE is configured to perform step S104:

S104: The RE receives instructions from the REC over the interface. The instructions specifies whether the RE is to use beamforming weights determined based on the internal information or based on the external information.

According to a second example the determination is made internally in the RE. Hence, according to an embodiment the RE is configured to perform step S106:

S106: The RE determines internally in the RE whether to use beamforming weights determined based on the internal information or based on the external information.

According to some aspects the access node provides network access to a set of the terminal devices. According to an embodiment the RE is then configured to perform step S108:

S108: The RE determines for which of the terminal devices to use beamforming weights determined based on the internal information, and for which others of the terminal devices to use beamforming weights determined based on the external information.

There may be different ways for the RE to make the determination in step S108. According to an embodiment all terminal devices for which beamforming weights are determined based on the external information are co-scheduled by the access node. According to an embodiment the determining in step S108 is based on at least one of load on the interface, load of air interface between the access node and the terminal devices, and services used by the terminal devices.

Reference is now made to FIG. 9 illustrating a method for configuring resources for terminal devices as performed by the REC of the access node according to an embodiment. As disclosed above the REC has an interface to the RE of the access node.

S208: The REC instructs the RE to selectively configure the resources for at least one of uplink reception and downlink transmission using beamforming weights determined either based on internal information obtained locally in the RE, or based on external information received from the REC over the interface.

Embodiments relating to further details of configuring resources for terminal devices as performed by the REC will now be disclosed.

Reference is now made to FIG. 10 illustrating methods for configuring resources for terminal devices as performed by the REC according to further embodiments. It is assumed that step S208 is performed as described above with reference to FIG. 9 and a thus repeated description thereof is therefore omitted.

As disclosed above, according to an embodiment the internal information is based on channel estimates determined by the RE and information stored in a channel state memory in the RE.

As disclosed above, according to an embodiment the RE provides the internal information to the REC. Hence, according to an embodiment the REC is configured to perform step S202:

S202: The REC obtains the internal information from the RE over the interface. The external information is then based on the internal information.

According to an embodiment the internal information is received from the RE using incrementally higher resolution and/or incrementally lower priority.

As disclosed above, according to an embodiment the external information comprises initial beamforming weights.

According to an embodiment the REC determines a quality measure based on information received from the RE. Hence, according to an embodiment the REC is configured to perform step S204:

S204: The REC determines a quality measure of the internal information, and wherein the external information is based on the internal information.

According to some aspects the access node provides network access to a set of the terminal devices. According to an embodiment the REC is then configured to perform step S206:

S206: The REC determines for which of the terminal devices to use beamforming weights determined based on the internal information, and for which others of the terminal devices to use beamforming weights determined based on the external information.

According to an embodiment the external information is also based on CSI reports.

There may be different ways for the REC to make the determination in step S206. According to an embodiment all terminal devices for which beamforming weights are determined based on the external information are co-scheduled by the access node. According to an embodiment the determining in step S206 is based on at least one of load on the interface, load of air interface between the access node and the terminal devices, and services used by the terminal devices.

The beamforming weights can be calculated in the RE when the beam shaped antenna gain primarily is wanted for extended service coverage. This is possible when the beam dimension not is used for MU-MIMO. Other reasons to perform the beamforming weight calculation in the RE could be to save bit rate on the interface between the REC and the RE or to minimize latency.

To be capable to dynamically control if the beamforming weights to use in the RE either come from the RE or from the REC, the RE is configured to selectively either combine or select between the two sources of beamforming weights (i.e., between internally determined beamforming weights and beamforming weights received from the REC). The REC may also reselect over time the type of source for beamforming weights that is used for a specific terminal device.

Figure 6:
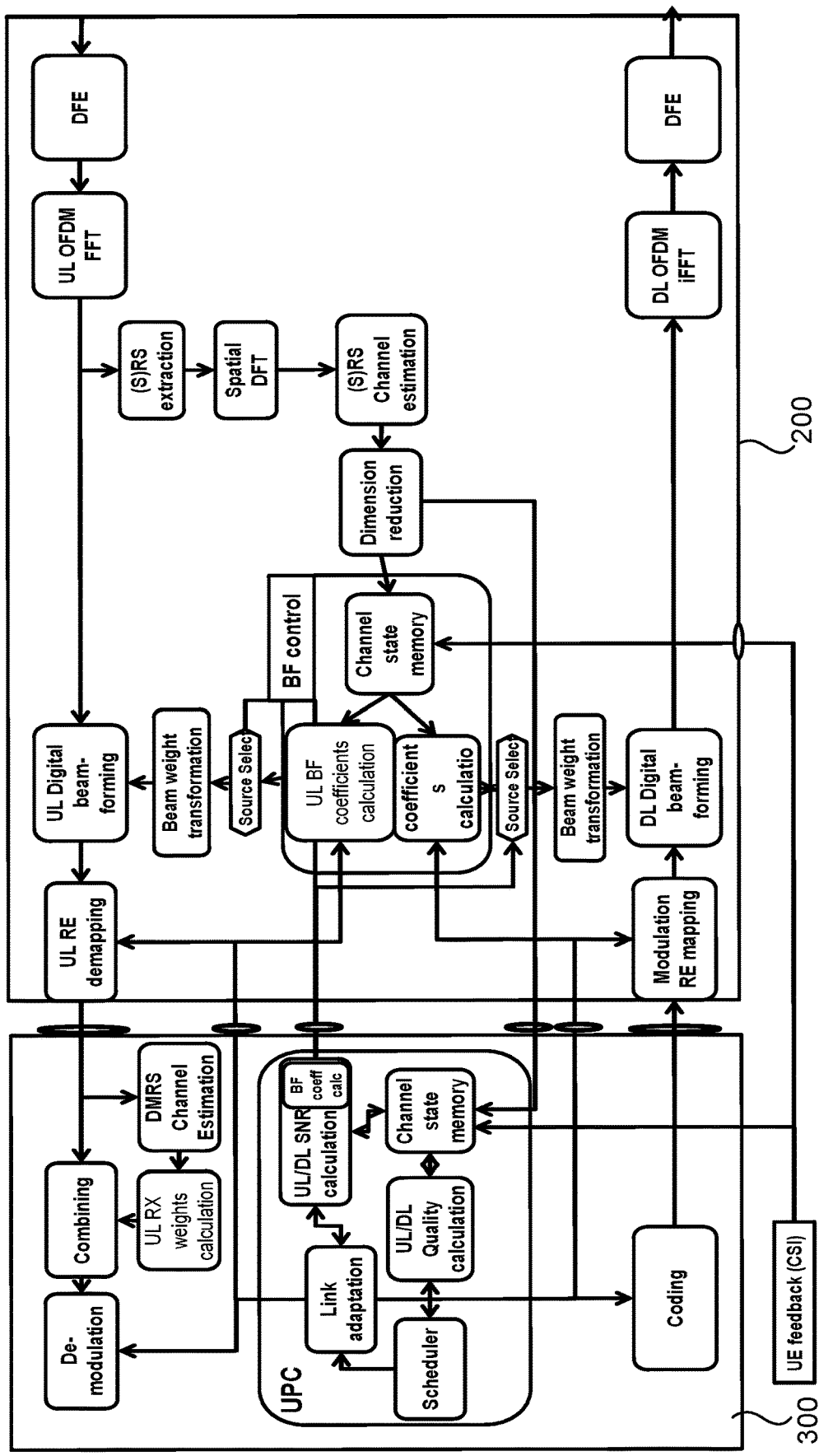

Further aspects applicable to both the embodiments of the RE and the REC will now be disclosed with reference to the embodiment of REC and RE illustrated in FIG. 6. The description of those entities already having been described with reference to any of FIGS. 2-5 is omitted for brevity.

A reference symbol extraction entity is configured to extract the reference symbols from the Resource Elements that are provided by the UL OFDM FFT from all antenna ports.

The spatial DFT entity and the channel estimation entity are configured to collectively provide a quality value for the fixed beam directions. The quality value is typically based on a filtering of the reference symbols per involved transmission antennas at the terminal device or MIMO layer within the resource block or for a filtering of a further processed channel estimate per involved transmission antennas at the terminal device or MIMO layer and extracted reference symbols. The beam direction space is provided by processing the reference symbols from all antennas through the spatial DFT entity.

A Dimension Reduction entity is configured to reduce dimension of data being inputted to the Dimension Reduction entity. For beamforming weight determination performed via the REC, the dimension of which fixed beam directions to use for the beamforming is reduced in order to limit the processing load when calculating the weights and the interface rate from the RE to the REC. The dimension reduction is based on the quality values from the Spatial DFT entity and the channel estimation entity. For beamforming weight determination performed internally in the RE, more dimensions can be stored, and thus providing better SNR in case of SU-MIMO transmission.

A Channel state memory is provided in the REC when beamforming weight determination is performed via the REC. For the terminal devices that are scheduled to be measured, the reference symbol based channel estimates can be sent to the REC and stored in the REC Channel State Memory. These stored channel estimates can then be used for link adaption as well as determination of beamforming weights. The content of the Channel state memory can be used when the data channel is active and is updated for every new measurement of reference symbols. In addition to this the Channel state memory can also store a covariance matrix for all beam directions that have been measured. Those values can be calculated in the REC. If no MU-MIMO pairing shall be done the beam direction related information does not need to be stored in the Channel state memory, which will lower the demand on the interface between the REC and the RE.

A Channel state memory is provided in the RE when beamforming weight determination is performed internally in the RE. For the reference symbols of the terminal devices that are scheduled to be measured, the reference symbol based Channel estimates are stored in the RE Channel State Memory. These stored channel estimates can be used for determining beamforming weights. The content of the Channel state memory can be used when the data channel is active and could be updated for every new measurement of reference symbols. If no MU-MIMO pairing is done, if no beam direction related information is stored in the REC based channel state memory, and if the covariance matrix will be used, the same covariance matrix as described in the channel state memory in the REC can instead be stored in the channel state memory in the RE.

A Source Select entity is configured to select and/or combine the beamforming weights that either originate from the REC or locally from the RE.

Even in the case where the channel estimate is sent to the REC, a local copy of the channel estimate can be stored in the RE. In case the REC will not send beamforming weights, the RE will have to use beamforming weights as determined internally. This can be due to the REC being satisfied with the beamforming weights determined internally or that the beamforming weights are not received properly by the RE (e.g., due to a lost message). The RE can signal to the REC if it has stored a local copy of the channel estimate. The RE can run out of local memory, thus such a signalling is recommended (but not mandated). Also, the REC can explicitly order the RE to store a local copy. Also in case no complete channel estimate is sent to the REC, a reduced channel estimate could be transmitted from the RE to the REC to aid the link adaptation and rank selection.

The UPC in the REC is configured to adaptively select which terminal devices that shall have their channel estimates sent to the REC and which terminal devices shall (only) have their channel estimates stored in the RE. Examples of which this adaptive selection can be made are the load of the interface between the REC and the RE, the load of the air interface between the access node and the terminal devices, and the type of services used by the terminal devices. These examples will now be disclosed in more detail.

The load of the interface between the REC and the RE can be used to determine if there is available capacity to send the channel estimate to the REC and if is there a good likelihood to send the updated channel estimate back to the RE. The channel estimate could, for link adaptation purposes, be sent to the REC even if no channel back to the RE is available. The latter could require the RE to also store the channel estimate in its memory.

In general terms, the more optimization of the beamforming function that is needed to improve the air interface efficiency, the more data the REC needs to have and to control. Thus, at a comparatively high load of the air interface, it can be better to prioritize channel estimation data than user payload data (which in case of poor link adaptation would need to be retransmitted). In such cases, a higher portion of the terminal devices will be selected to send their channel estimates to the REC.

One reason for modifying the beamforming weights in the REC is for multi-user optimization purposes, either for terminal devices in the same served region or terminal devices in in neighbouring served regions. Such optimizations could be most efficient if the terminal device has a continuous service (as compared to a bursty service) with repetitive transmissions. The REC can then use channel estimates to match terminal devices that are likely to transmit at the same time into MU-MIMO groups, and determine optimal beamforming weights for each terminal device in such a group. The REC determines when transmissions occur (and can thus maintain such a group), but this is only meaningful if the transmissions are not bursty. Thus services such as audio or video streaming are suitable for MU-MIMO matching and terminal devices running such services can be selected to have their channel estimates sent to the REC.

Further, the RE could first reduce channel estimates to the REC and then sends as many channel estimates as possible to the REC. In case of time division multiplex (TDD), there will be room for further channel estimates being transferred in the DL time slots. The REC could then be configured to steer the DL transmission of the beamforming weights and possibly the order/priority of the UL channel estimates if some are more urgent than others.

Figure 11:
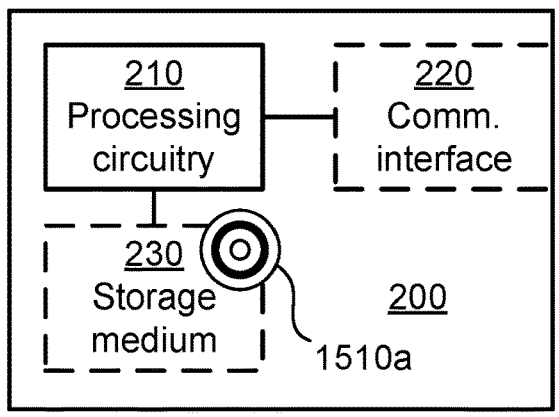
FIG. 11 is a schematic diagram showing functional units of an RE according to an embodiment.

FIG. 11 schematically illustrates, in terms of a number of functional units, the components of an RE according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the RE to perform a set of operations, or steps, S102-S112b, as disclosed above. For example, the storage medium 230 may store the set of operations, and the processing circuitry 210 may be configured to retrieve the set of operations from the storage medium 230 to cause the RE to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The RE may further comprise a communications interface 220 for communications with the REC. As such the communications interface 220 may comprise one or more transmitters and receivers, comprising analogue and digital components.

The processing circuitry 210 controls the general operation of the RE e.g. by sending data and control signals to the communications interface 220 and the storage medium 230, by receiving data and reports from the communications interface 220, and by retrieving data and instructions from the storage medium 230. Other components, as well as the related functionality, of the RE are omitted in order not to obscure the concepts presented herein.

Figure 12:
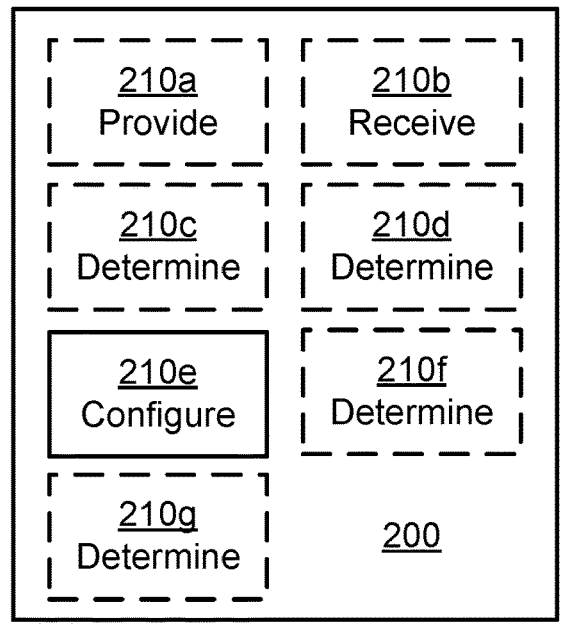
FIG. 12 is a schematic diagram showing functional modules of an RE according to an embodiment.

FIG. 12 schematically illustrates, in terms of a number of functional modules, the components of an RE according to an embodiment. The RE of FIG. 12 comprises a configure module 210e configured to perform step S110. The RE of FIG. 12 may further comprise a number of optional functional modules, such as any of a provide module 210a configured to perform step S102, a receive module 210b configured to perform step S104, a determine module 210c configured to perform step S106, a determine module 210d configured to perform step S108, a determine module 210f configured to perform step S112a, and a determine module 210g configured to perform step S112b In general terms, each functional module 210a-210g may be implemented in hardware or in software. Preferably, one or more or all functional modules 210a-210g may be implemented by the processing circuitry 210, possibly in cooperation with functional units 220 and/or 230. The processing circuitry 210 may thus be arranged to from the storage medium 230 fetch instructions as provided by a functional module 210a-210g and to execute these instructions, thereby performing any steps of the RE as disclosed herein.

Figure 13:
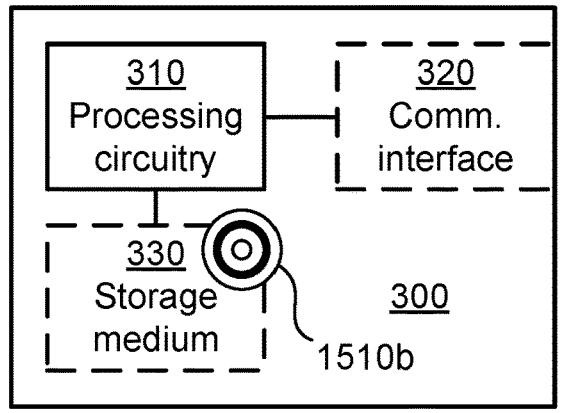
FIG. 13 is a schematic diagram showing functional units of an REC according to an embodiment.

FIG. 13 schematically illustrates, in terms of a number of functional units, the components of an REC according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1510b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the REC to perform a set of operations, or steps, S202-S208, as disclosed above. For example, the storage medium 330 may store the set of operations, and the processing circuitry 310 may be configured to retrieve the set of operations from the storage medium 330 to cause the REC to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The REC may further comprise a communications interface 320 for communications with the RE. As such the communications interface 320 may comprise one or more transmitters and receivers, comprising analogue and digital components.

The processing circuitry 310 controls the general operation of the REC e.g. by sending data and control signals to the communications interface 320 and the storage medium 330, by receiving data and reports from the communications interface 320, and by retrieving data and instructions from the storage medium 330. Other components, as well as the related functionality, of the REC are omitted in order not to obscure the concepts presented herein.

Figure 14:
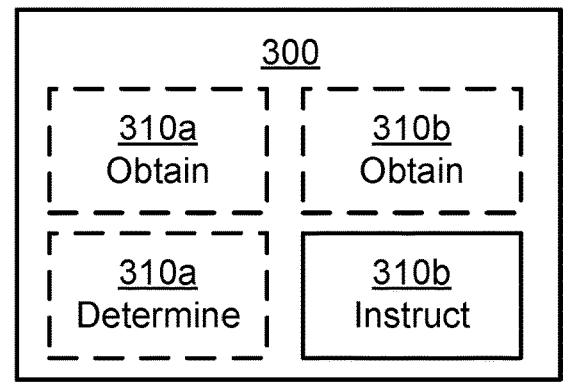
FIG. 14 is a schematic diagram showing functional modules of an REC according to an embodiment.

FIG. 14 schematically illustrates, in terms of a number of functional modules, the components of an REC according to an embodiment. The REC of FIG. 14 comprises an instruct module 310d configured to perform step S208. The REC of FIG. 14 may further comprise a number of optional functional modules, such as any of an obtain module 310a configured to perform step S202, an obtain module 310b configured to perform step S204, and a determine module 310c configured to perform step S206. In general terms, each functional module 310a-310d may be implemented in hardware or in software. Preferably, one or more or all functional modules 310a-310d may be implemented by the processing circuitry 310, possibly in cooperation with functional units 320 and/or 330. The processing circuitry 310 may thus be arranged to from the storage medium 330 fetch instructions as provided by a functional module 310a-310d and to execute these instructions, thereby performing any steps of the REC as disclosed herein.

The RE and REC may be provided as standalone devices or as a part of at least one further device. For example, as disclosed above the RE and REC may be provided in an access node. Alternatively, functionality of the RE and the REC may be distributed between at least two devices, or nodes.

Thus, a first portion of the instructions performed by the RE or REC may be executed in a first device, and a second portion of the of the instructions performed by the RE or REC may be executed in a second device; the herein disclosed embodiments are not limited to any particular number of devices on which the instructions performed by the RE or REC may be executed. Hence, the methods according to the herein disclosed embodiments are suitable to be performed by an RE or REC residing in a cloud computational environment. Therefore, although a single processing circuitry 210, 310 is illustrated in FIGS. 11 and 13 the processing circuitry 210, 310 may be distributed among a plurality of devices, or nodes. The same applies to the functional modules 210a-210g, 310a-310d of FIGS. 12 and 14 and the computer programs 1520a, 1520b of FIG. 15 (see below).

Figure 15:
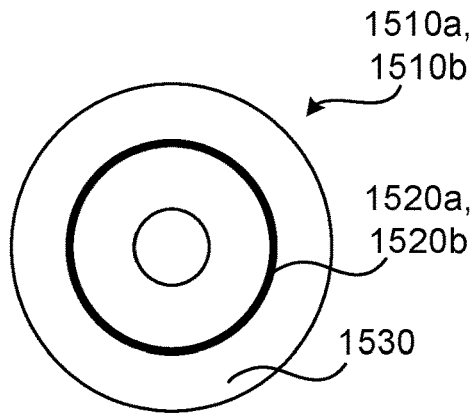
FIG. 15 shows one example of a computer program product comprising computer readable means according to an embodiment.

FIG. 15 shows one example of a computer program product 1510a, 1510b comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any steps of the RE as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520b and/or computer program product 1510b may thus provide means for performing any steps of the REC as herein disclosed.

In the example of FIG. 15, the computer program product 1510a, 1510b is illustrated as an optical disc, such as a CD (compact disc) or a DVD (digital versatile disc) or a Blu-Ray disc. The computer program product 1510a, 1510b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b is here schematically shown as a track on the depicted optical disk, the computer program 1520a, 1520b can be stored in any way which is suitable for the computer program product 1510a, 151a.

The inventive concept has mainly been described above with reference to a few embodiments. However, as is readily appreciated by a person skilled in the art, other embodiments than the ones disclosed above are equally possible within the scope of the inventive concept, as defined by the appended list of claims. For example, although the embodiments mainly have been described in a time division duplex (TDD) context, at least some of the embodiments are also applicable for frequency division duplex (FDD). One difference in FDD compared to TDD is that the UL measurements cannot for sure be used for DL, due to the different frequencies UL and DL. In FDD the terminal device sends information about what beam direction the terminal device deems is best (from a raster of predetermined beams that the access node is repeatedly transmitting, i.e. a "code book"). In this case, the REC may need to provide beamforming weights to the RE (thus defining the external information).

The invention claimed is:

1. A method for configuring resources for terminal devices, the method being performed by a radio equipment (RE) of an access node, the RE having a bidirectional interface to a radio equipment controller (REC) of the access node, the method comprising:

selecting one of:
    internal information obtained locally in the RE, and
    external information received from the REC over the interface; and
configuring the resources for at least one of uplink reception and downlink transmission based on beamforming weights, the beamforming weights being determined based on the selected one of internal information obtained locally in the RE and external information received from the REC over the interface; and
transmitting or receiving based on the configured resources.

2. The method according to claim 1, wherein the internal information is based on channel estimates determined by the RE and information stored in a channel state memory in the RE.

3. The method according to claim 1, further comprising:
    providing the internal information to the REC over the interface, and wherein the external information is based on the internal information.

4. The method according to claim 3, wherein the internal information is provided to the REC using incrementally higher resolution and/or incrementally lower priority.

5. The method according to claim 3, wherein the channel state memory stores channel state information.

6. The method according to claim 1, wherein the external information comprises initial beamforming weights.

7. The method according to claim 1, wherein when resources for uplink reception are configured, the method further comprises determining reception beams using the beamforming weights.

8. The method according to claim 1, wherein when resources for downlink transmission are configured, the method further comprises determining transmission beams using the beamforming weights.

9. The method according to claim 1, wherein the internal information obtained locally in the RE is obtained autonomously by the RE.

10. The method according to claim 1, wherein in the step of selecting comprises an alternation between the use of internal information and the use of external information is made.

11. The method according to claim 1, further comprising:
    receiving instructions from the REC over the interface whether to use beamforming weights determined based on the internal information or based on the external information, and wherein the selecting is based on the received instructions.

12. The method according to claim 1, further comprising:
    determining internally in the RE whether to use beamforming weights determined based on the internal information or based on the external information.

13. The method according to claim 1, wherein the access node provides network access to a set of the terminal devices, the method further comprising:
    determining for which of the terminal devices to use beamforming weights determined based on the internal information, and for which others of the terminal devices to use beamforming weights determined based on the external information.

14. The method according to claim 13, wherein terminal devices for which beamforming weights are determined based on the external information are co-scheduled by the access node.

15. The method according to claim 13, wherein said determining is based on at least one of load on the interface, load of air interface between the access node and the terminal devices, and services used by the terminal devices.

16. A method for configuring resources for terminal devices, the method being performed by a radio equipment controller (REC) of an access node, the REC having an interface to a radio equipment (RE) of the access node, the method comprising:
 instructing the RE to selectively configure the resources for at least one of uplink reception and downlink transmission using beamforming weights determined either based on a selection of one of internal information obtained locally in the RE and external information received from the REC over the interface.

17. The method according to claim 16, wherein the internal information is based on channel estimates determined by the RE and information stored in a channel state memory in the RE.

18. The method according to claim 16, further comprising:
 obtaining the internal information from the RE over the interface, and wherein the external information is based on the internal information.

19. The method according to claim 18, further comprising transmitting instructions to the RE over the interface to select one of internal information obtained locally in the RE and external information received from the REC over the interface.

20. The method according to claim 16, wherein the external information comprises initial beamforming weights.

21. The method according to claim 16, further comprising:
 determining a quality measure of the internal information, and wherein the external information is based on the internal information.

22. The method according to claim 21, wherein the REC is connected via the interface to two or more REs that handle the terminal devices for which beamforming weights are determined based on the external information.

23. The method according to claim 16, wherein the access node provides network access to a set of the terminal devices, the method further comprising:
 determining for which of the terminal devices to use beamforming weights determined based on the internal information, and for which others of the terminal devices to use beamforming weights determined based on the external information.

24. The method according to claim 23, wherein terminal devices for which beamforming weights are determined based on the external information are co-scheduled by the access node.

25. The method according to claim 23, wherein said determining is based on at least one of load on the interface, load of air interface between the access node and the terminal devices, and services used by the terminal devices.

26. A radio equipment (RE) of an access node for configuring resources for terminal devices, the RE having an interface to a radio equipment controller (REC) of the access node and comprising:
 processing circuitry; and
 a storage medium storing instructions that, when executed by the processing circuitry, cause the RE to:
  select one of:
   internal information obtained locally in the RE, and
   external information received from the REC over the interface; and
  configure the resources for at least one of uplink reception and downlink transmission using beamforming weights determined based on the selected one of internal information obtained locally in the RE and external information received from the REC over the interface.

* * * * *

UNITED STATES PATENT AND TRADEMARK OFFICE
CERTIFICATE OF CORRECTION

PATENT NO. : 10,524,273 B2  
APPLICATION NO. : 15/320453  
DATED : December 31, 2019  
INVENTOR(S) : Österling et al.

Page 1 of 1

It is certified that error appears in the above-identified patent and that said Letters Patent is hereby corrected as shown below:

In the Drawings

Fig. 6, Sheet 6 of 8, delete "calculatio" and insert -- calculation --, therefor.

Fig. 14, Sheet 8 of 8, delete "310a" and insert -- 310c --, therefor.

Fig. 14, Sheet 8 of 8, delete "310b" and insert -- 310d --, therefor.

In the Specification

Column 4, Line 42, delete "device boo" and insert -- device 600 --, therefor.

Column 15, Line 43, delete "151a." and insert -- 1510b. --, therefor.

Signed and Sealed this  
Thirtieth Day of June, 2020

Andrei Iancu  
*Director of the United States Patent and Trademark Office*